(12) United States Patent
Heinzl

(10) Patent No.: US 9,770,691 B2
(45) Date of Patent: *Sep. 26, 2017

(54) COOLING DEVICE

(71) Applicant: Major Bravo Limited, Tortola (VG)

(72) Inventor: Wolfgang Heinzl, Ramerberg (DE)

(73) Assignee: Major Bravo Limited, Tortola (VG)

( * ) Notice: Subject to any disclaimer, the term of this patent is extended or adjusted under 35 U.S.C. 154(b) by 574 days.

This patent is subject to a terminal disclaimer.

(21) Appl. No.: 14/371,634

(22) PCT Filed: Jan. 9, 2013

(86) PCT No.: PCT/EP2013/050250
§ 371 (c)(1),
(2) Date: Jul. 10, 2014

(87) PCT Pub. No.: WO2013/104640
PCT Pub. Date: Jul. 18, 2013

(65) Prior Publication Data
US 2015/0014144 A1 Jan. 15, 2015

(30) Foreign Application Priority Data

Jan. 11, 2012 (DE) .................... 10 2012 000 389

(51) Int. Cl.
*B01D 3/14* (2006.01)
*B01D 61/36* (2006.01)
(Continued)

(52) U.S. Cl.
CPC ........... *B01D 61/364* (2013.01); *B01D 3/145* (2013.01); *B01D 61/366* (2013.01);
(Continued)

(58) Field of Classification Search
CPC ...... B01D 3/145; B01D 61/36; B01D 61/364; B01D 61/366; B01D 63/00; B01D 63/082;
(Continued)

(56) References Cited

U.S. PATENT DOCUMENTS 2,574,116 A 11/1951 Loumiet et Lavigne
4,003,970 A 1/1977 Vodicka
(Continued)

FOREIGN PATENT DOCUMENTS

DE 24 52 123 5/1976
DE 40 19 991 1/1992
(Continued)

OTHER PUBLICATIONS

Search Report for German Patent Application No. 10 2012 000 389.7 (Sep. 9, 2012).
(Continued)

*Primary Examiner* — Jonathan Miller
(74) *Attorney, Agent, or Firm* — Mintz Levin Cohn Ferris Glovsky and Popeo, P.C.; Peter F. Corless; Steven M. Jensen

(57) ABSTRACT

A cooling device for cooling a fluid comprises a vertical cooling tower, into an upper area of which the fluid to be cooled is fed and from a lower area of which the cooled fluid is discharged. The fluid in the cooling tower is cooled by a cooling gas flowing from the bottom to the top. At least one installation in which the fluid is conducted is provided in the gas space of the cooling tower through which cooling gas flows. Each installation comprises at least one fluid channel that is separated at least in part from the gas space of the cooling tower by a fluid-tight membrane wall that is permeable to vapor on both sides.

14 Claims, 5 Drawing Sheets

Figure 7:
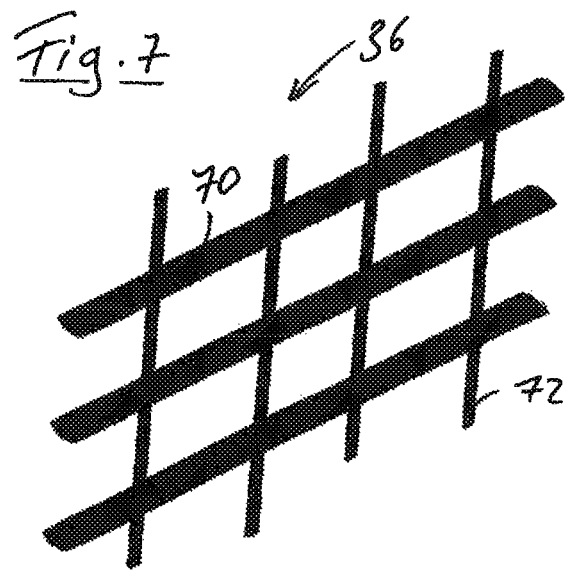

(51) Int. Cl.
  *B01D 63/08* (2006.01)
  *F28B 1/06* (2006.01)
  *F28D 9/00* (2006.01)
  *F28D 21/00* (2006.01)
  *F28C 1/02* (2006.01)

(52) U.S. Cl.
  CPC .............. *B01D 63/082* (2013.01); *F28B 1/06* (2013.01); *F28C 1/02* (2013.01); *F28D 9/0075* (2013.01); *F28D 9/0087* (2013.01); *F28D 21/0015* (2013.01); *B01D 2313/14* (2013.01)

(58) Field of Classification Search
  CPC ........ F28C 1/02; F28D 9/0075; F28D 9/0087; F28D 21/0015
  See application file for complete search history.

(56) References Cited

U.S. PATENT DOCUMENTS

| | | |
|---|---|---|
| 4,452,300 A | 6/1984 | Zeilon |
| 5,535,989 A | 7/1996 | Sen |
| 6,490,862 B1 | 12/2002 | Beerlage et al. |
| 6,672,099 B1 * | 1/2004 | Yoshimi ................. F25B 19/00 62/315 |
| 7,837,877 B2 * | 11/2010 | Cao ....................... B01D 3/065 210/502.1 |
| 2004/0211725 A1 | 10/2004 | Jansen et al. |
| 2013/0264260 A1 | 10/2013 | Heinzl |

FOREIGN PATENT DOCUMENTS

| | | |
|---|---|---|
| DE | 600 08 873 | 1/2005 |
| EP | 0 922 191 | 6/1999 |
| JP | H05-71883 A | 3/1993 |
| JP | H05-240596 A | 9/1993 |
| WO | 00/72947 | 12/2000 |
| WO | 01/18467 A1 | 3/2001 |
| WO | 03/000389 | 1/2003 |
| WO | 2007/054311 | 5/2007 |
| WO | 2012/062392 | 5/2012 |
| WO | 2013/037554 | 3/2013 |

OTHER PUBLICATIONS

International Search Report for International Application No. PCT/EP2013/050250 (Jul. 19, 2013).

\* cited by examiner

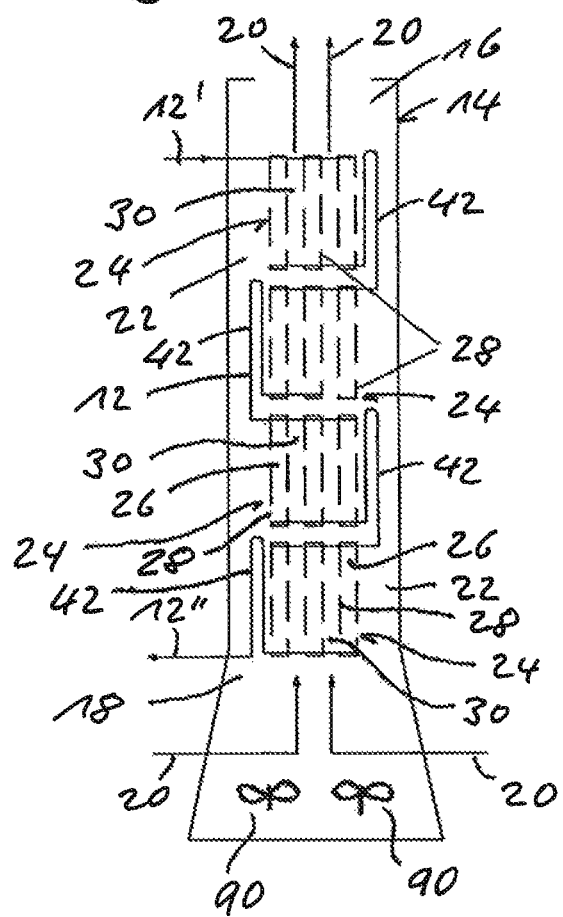

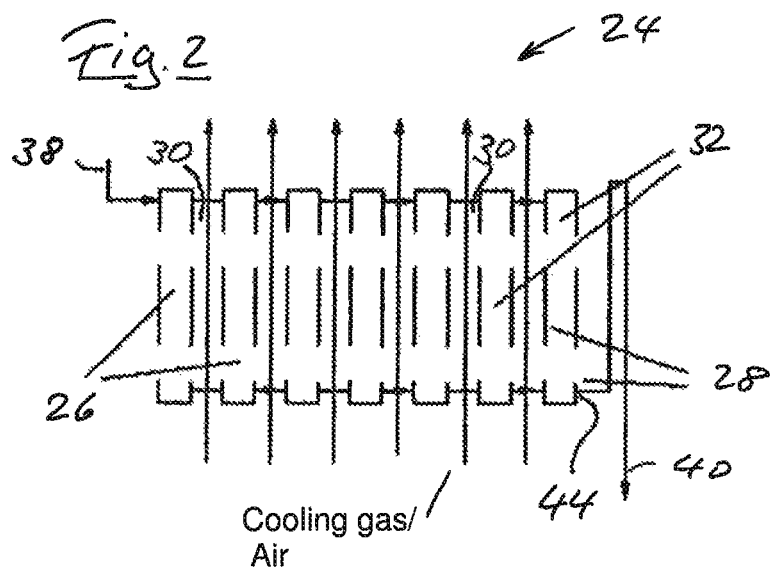
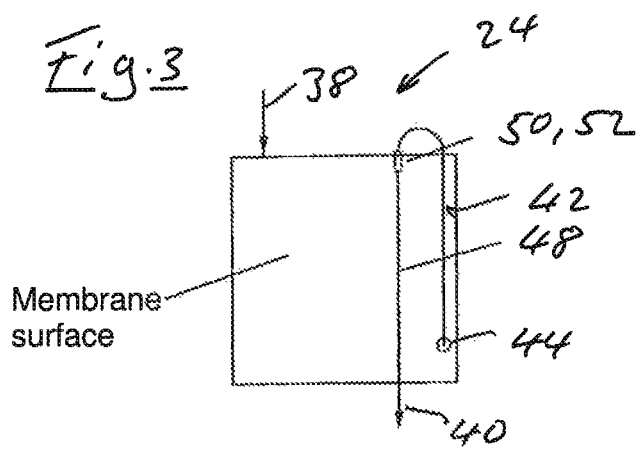

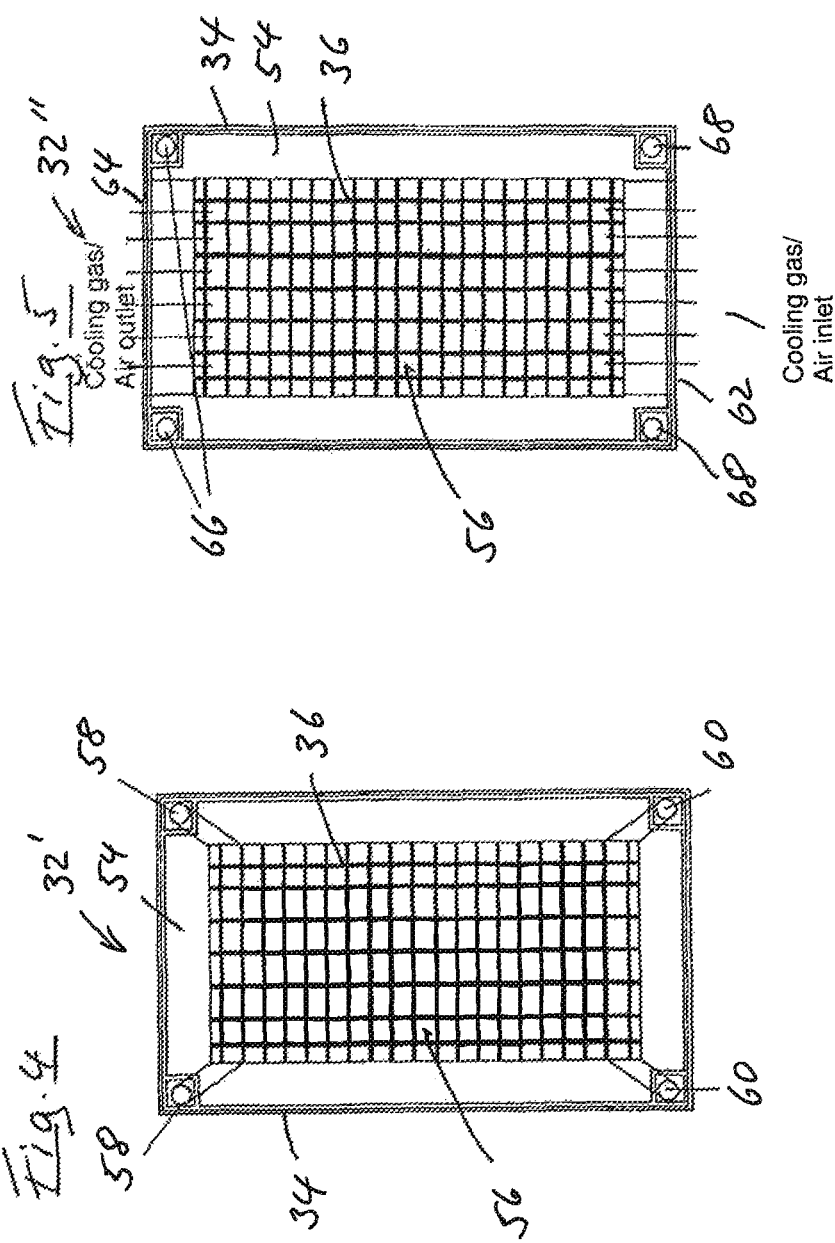

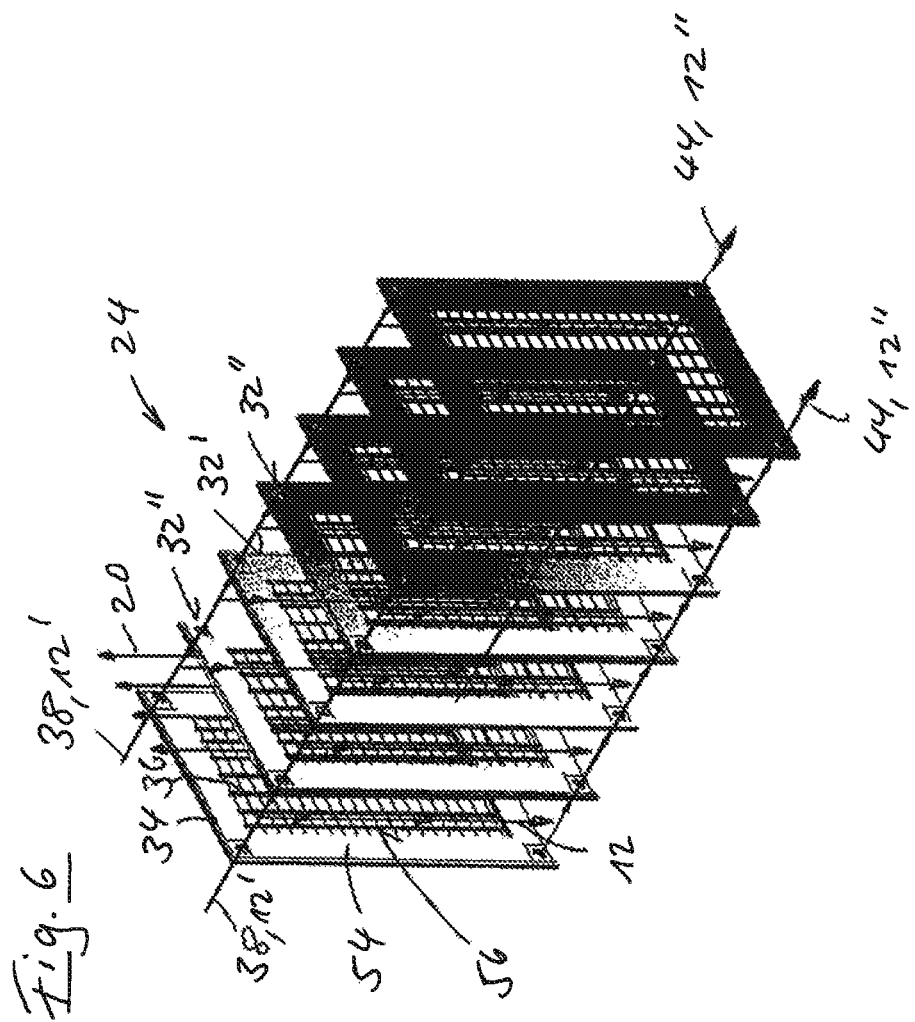

COOLING DEVICE

CROSS-REFERENCE TO RELATED APPLICATIONS

This application is a National Phase application filed under 35 USC 371 of International Application No. PCT/EP2013/050250 (WO 2013/104640) with an International Filing Date of Jan. 9, 2013 which claims under 35 U.S.C. §119(a) the benefit of German Application No. 10 2012 000 389.7, filed Jan. 11, 2012, the entire contents of which are incorporated herein by reference.

The invention relates to a cooling apparatus for cooling a liquid, in particular water, having a vertical cooling tower. It further relates to a membrane distillation plant having a multistage membrane distillation apparatus and having such a cooling apparatus.

With wet cooling towers such as are used in power stations, the water to be cooled is trickled over a large surface with a film which is as thin as possible. To achieve a distribution of the water over the trickle surfaces which is as good as possible, wetting agents can be added to the water.

In natural draft cooling towers, an upwind arises by hot water which is supplied to the cooling tower in an upper region and is cooled by evaporation on its path downward. In this respect, air having the environmental parameters pressure, temperature and moisture flows from below into the cooling tower. The air leaves the upper region of the cooling tower at the saturation limit.

In the previously customary cooling towers, a growth of organic matter in the cooling tower can occur due to wet, hot surfaces. Under certain operating conditions, legionella can thus inter alia develop, which can only be prevented by the use of disinfectants or by a clear shift in the pH.

The natural water introduced into the cooling tower contains ingredients such as minerals. In certain cases, a concentration of the ingredients introduced with the natural water should be achieved which is as high as possible to reduce the fresh water requirement and also to keep the quantity of blowdown water small which is required in order not to allow the concentration of the water ingredients in the cooling tower water to increase beyond a specific limit value. In this respect, the risk of so-called scaling, namely the formation of mineral deposits, determines the limit value of the concentration. This limit value can now admittedly be displaced upwardly by the use of antiscalants. However, the blowdown water is additionally polluted by such antiscalants. This applies both to natural draft cooling towers and to induced draft wet cooling towers.

So-called indirect cooling towers are also already known in which the water does not come into direct contact with the air, but is rather separated from the air by partition walls such as tubes. Such cooling towers always have an induced draft, i.e. air is blown by means of a fan over the dry surfaces. Such cooling towers do not reach the lower temperatures of a wet cooling tower cooled by evaporation. Since no temperature change arises due to phase change as with evaporation, the surfaces are also much larger.

Conventional cooling apparatus for cooling a liquid are known from documents U.S. Pat. No. 6,672,099 B1 and U.S. Pat. No. 4,452,300 A.

It is the underlying object of the invention to provide an improved cooling apparatus of the initially named kind with which the previously stated problems have been eliminated. In this respect the heat exchange procedure should take place at surfaces which are as dry as possible, wherein the thermal surface performance of a conventional wet cooling tower should be achieved despite the dry heat exchanger surfaces. Furthermore, a membrane distillation plant having such a cooling apparatus should be provided in which the cooling apparatus is advantageously used.

The object is satisfied in accordance with the invention by a cooling apparatus having the features of claim 1. In accordance with the invention, a cooling apparatus is thus provided for cooling a liquid, in particular water, which comprises a vertical cooling tower to which the liquid to be cooled is supplied in an upper region and from which the cooled liquid is led off in a lower region. In this respect, the liquid is cooled in the cooling tower by a cooling gas, in particular air, flowing from bottom to top. A plurality of installations in which the liquid is conducted are provided in the gas space of the cooling tower flowed through by the cooling gas. In this respect, a respective installation comprises at least one liquid passage which is separated from the gas space of the cooling tower at least partly by a vapor-permeable, liquid-tight membrane wall at both sides. Furthermore, the cooling tower has one or more fans.

It is ensured, on the one hand, due to this configuration that the heat exchanging procedure takes place at dry surfaces, whereas, on the other hand, despite these dry surfaces the thermal surface performance of a conventional wet cooling tower is achieved. The installation or installations act/acts as evaporators whose surfaces separate the downwardly flowing liquid from the cooling gas flowing from bottom to top.

A growth of biology on the surfaces of the installations acting as evaporators is avoided. The defined surfaces of the installations are easily accessible for a direct chemical cleaning. Since all surfaces of the installations are accessible in a defined manner, the use of chemicals can be kept low, with an optimum uniform distribution of the respective chemical cleaning agents being ensured. Since the chemical cleaning can take place for the avoidance of the risk of scaling at defined surfaces, a higher concentration of the cooling tower liquid is possible.

In accordance with the invention, the installations are connected following one another vertically and in series.

At least one installation preferably comprises a plurality of liquid passages connected in parallel and preferably each extends generally vertically. In this respect, the liquid passages connected in parallel can in particular be arranged horizontally next to one another.

In accordance with a preferred practical embodiment of the cooling apparatus in accordance with the invention, at least one installation is provided which comprises a plurality of liquid passages which are connected in parallel, which are arranged horizontally next to one another and which are each separated from the gas space of the cooling tower by a membrane wall, in particular a flat membrane, at at least two mutually oppositely disposed sides, with a respective pair of horizontally adjacent liquid passages having mutually facing membrane walls, in particular flat membranes, which laterally bound a gas passage through which cooling gas of the cooling gas flow acting on the gas space flows.

In this respect, a respective installation can advantageously comprise a plurality of mutually connected frame elements, with the functional units of liquid passage and gas passage each being provided in the form of such a frame element.

The frame elements are preferably provided with web structures and are connected to one another via these web structures.

The frame elements can each be provided with a spacer, in particular a grid-like spacer.

The membrane wall provided between a respective liquid passage and a respective gas passage adjacent thereto is preferably associated with one of the two respective mutually adjacent frame elements.

The web structures via which the individual frame elements can be connected to one another can, for example, be welded web structures or adhesive structures via which the frame elements are welded or bonded to one another. In the case of welded web structures, a friction welding process, a laser welding process and/or a heating element welding process can be used, for example, for connecting the frame elements.

In accordance with the invention, the installations which follow one another vertically and which are connected in series are connected to one another such that their liquid passages are each completely filled with liquid.

This could now admittedly be achieved, for example, in that the liquid outflow is throttled and a head of water is built up. The head of water would, however, have the result that a respective membrane in the lower region of the cooling tower would be exposed to a higher pressure load than in the upper region of the cooling tower due to the higher static pressure.

In accordance with the invention, in particular for the reduction of this pressure load, vertically adjacent installations are each connected to one another via a return passage which is arranged between a liquid outlet provided in a lower region of a liquid passage of the preceding installation viewed in the direction of flow of the liquid and a liquid inlet provided in an upper region of a liquid passage of the following installation and which, starting from the liquid outlet of the preceding installation, is first conducted upwardly at least up to the uppermost possible liquid level in this installation.

It is ensured by the upward conducting of the return in the liquid outlet of the preceding installation to at least the uppermost possible liquid level that the liquid conducting liquid passage or passages of a respective installation is/*are each completely filled with liquid.

In this respect, the return passage is in particular configured in the manner of a U pipe in accordance with the invention. In this respect in accordance with the invention, the upper region of the outflow part of the return passage configured in the manner of a U pipe comprises a passage section which is at least partly bounded by a further membrane wall, again preferably vapor permeable and liquid tight at both sides, which comes into contact with the liquid, on the one hand, and with the gas space of the cooling tower, on the other hand. It is thus ensured that with a freely outflowing liquid and while avoiding a liquid jam over the cooling tower height at a respective installation of the cooling tower, the height of the head of liquid of a cooling tower installation always loads the respective membrane wall only at a maximum.

A guide of the cooling tower liquid in a U-pipe apparatus is therefore possible, for example, after the flowing through of the respective liquid passages bounded by at least one membrane wall in which the U-pipe apparatus comprises an upwardly conducting pipe having a 180° deflection, a down pipe and a hydrophobic, microporous membrane. The liquid exiting a respective cooling tower installation is conducted so far upwards that the respective liquid passages of the cooling tower installation bounded by at least one membrane are always completely filled with liquid. The down pipes are dimensioned such that they are never completely filled with liquid and there is thus no addition of the hydrostatic pressure of the cooling tower installations from top to bottom. So that the down pipe can run empty in downtime, the U pipe apparatus is advantageously fitted in its upper region with a piece of microporous, hydrophobic membrane which is vapor permeable and in particular air permeable. It is thus ensured that the down pipes can empty on a switching off of the water to be cooled and, conversely, on a putting into operation, no gas cushion or air cushion can build up since the gas or the air can both flow out and flow in via the membrane.

The membrane distillation plant in accordance with the invention is characterized by the features of claim 9. In accordance with the invention, a membrane distillation plant is provided having a multistage membrane distillation apparatus comprising an evaporator, a plurality of condensation and evaporation stages as well as a condenser for concentrating a liquid and having a cooling apparatus in accordance with the invention in accordance with any one of the claims 1 to 8. In this respect, the liquid to be concentrated is supplied to the system comprising the condenser of the membrane distillation apparatus and the cooling apparatus. The cooling apparatus is connected upstream of the membrane distillation apparatus for preconcentrating the liquid. Liquid cooled during the preconcentration is supplied to the condenser as cooling fluid from the cooling apparatus.

In accordance with a preferred embodiment of the membrane distillation plant in accordance with the invention, the condenser of the membrane distillation apparatus comprises a vapor space as well as a cooling fluid passage which is separated therefrom by a condensation wall and which is part of a cooling circuit during the preconcentration which comprises the installation or installations and in which the liquid to be concentrated circulates as coolant.

Possible new process thus in particular result from the combination of cooling and concentration of the liquid with the cooling tower installations. In this respect, in particular the possible concentration of waters containing salt using the wet cooling tower with dry surfaces as the preconcentrator is of advantage.

A multistage membrane distillation apparatus comprising an evaporator, a plurality of condensation and evaporation stages as well as a condenser for concentrating a liquid is known, for example, from WO 2007/054311.

With such a membrane distillation apparatus, liquid is evaporated and condensed again using thermal energy. On the evaporation of the liquid, the respective components evaporate at a given temperature and at a vapor pressure dependent on said temperature such that individual components are condensed. The evaporated liquid is separated from the vapor space by a microporous, vapor permeable, but non-liquid permeable membrane. Vapor, which passes through the membrane, arises at the boundary surface between the liquid to be concentrated and the membrane due to temperature differences or vapor pressure differences between the liquid to be concentrated and the vapor space.

A vapor space of a respective subsequent condensation and evaporation stage can in particular be directly adjacent to the membrane wall of the preceding condensation and evaporation stage for reducing the flows of the liquid to be concentrated and of the vapor, wherein the membrane wall separates the liquid passage of the preceding condensation and evaporation stage from the vapor space of the following condensation and evaporation stage.

The evaporator can, for example, comprise a heating fluid passage, a liquid passage for the liquid to be concentrated, an exchanger wall separating the heating fluid passage from the liquid passage and a membrane wall bounding the liquid passage on the side disposed opposite the exchanger wall, wherein a vapor space of a first condensation and evaporation stage can be directly adjacent to the membrane of the evaporator and this membrane wall can thus separate the liquid passage of the evaporator from the vapor space of the first condensation and evaporation stage. As already stated, the condenser can, for example comprise a vapor space, a cooling fluid passage and a condensation wall separating the vapor space from the cooling fluid passage. The vapor space of the condenser can advantageously be directly adjacent to the membrane wall of the last condensation and evaporation stage so that this membrane wall separates the liquid passage of the last condensation and evaporation stage from the vapor space of the condenser.

Condensation and evaporation can take place at least substantially free of inert gas and at a lower pressure and temperature level in a respective following condensation and evaporation stage than in the preceding condensation and evaporation stage. The liquid to be concentrated can be acted on by vacuum to lower its absolute pressure, with the absolute pressure of the liquid to be concentrated in a respective liquid passage of the membrane distillation apparatus being lowered down to the boiling vapor pressure corresponding to the liquid temperature in this liquid passage. The vapor spaces of the condensation and evaporation stages and of the condenser can be acted on by vacuum for lowering its absolute pressure below the environmental pressure. In accordance with a preferred embodiment of the membrane distillation apparatus, the absolute pressure in a respective vapor space can be lowered at least substantially down to the vapor pressure of the liquid to be concentrated neighboring via the adjacent membrane wall and additionally by the differential pressure resulting on the flow of the vapor through the adjacent membrane wall. The vacuum in a respective vapor space therefore at least substantially corresponds to the vapor pressure of the liquid to be concentrated neighboring via the adjacent membrane all, is increased by the differential pressure resulting on the flowing of the vapor through the membrane wall, with it having to be taken into account that an increased vacuum corresponds to a lowered absolute pressure.

In another respect, the membrane distillation apparatus can be configured, for example, such as is described in WO 2007/054311.

Figure 8:
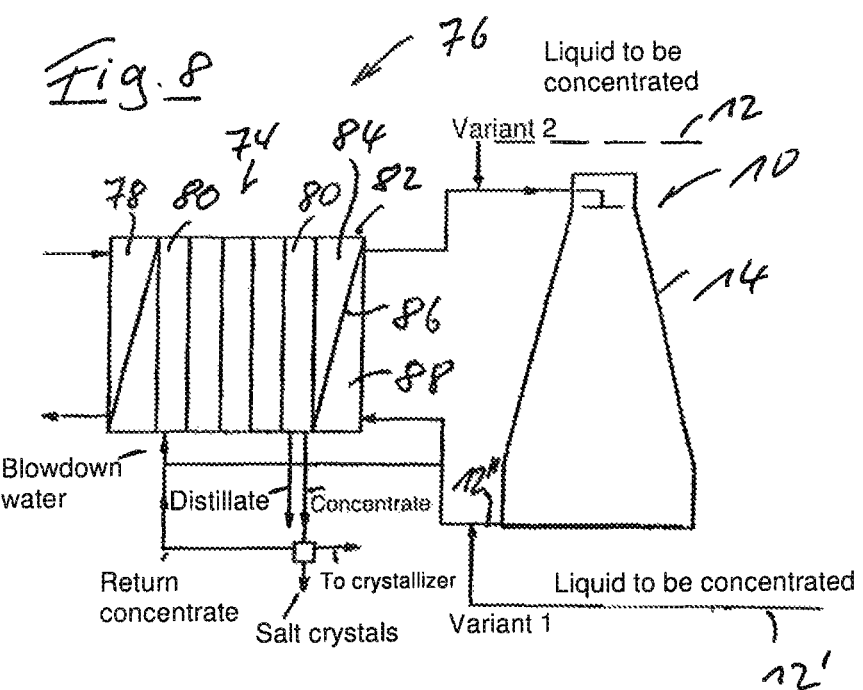

The invention will be explained in more detail in the following with reference to embodiments and to the drawing; there are shown in this:

FIG. 1 a schematic representation of an exemplary embodiment of a cooling apparatus;

FIG. 2 a schematic representation of an exemplary installation of the cooling tower with a plurality of liquid passages connected in parallel and preferably extending generally vertically;

FIG. 3 a schematic representation of an exemplary installation of the cooling tower with a return passage configured in the manner of a U-pipe;

FIG. 4 a schematic front view of an exemplary embodiment of a frame element which can be used as a liquid frame;

FIG. 5 a schematic front view of an exemplary embodiment of a frame element which can be used as a cooling gas frame;

FIG. 6 a schematic, perspective expanded view of an exemplary embodiment of an installation of the cooling tower comprising a plurality of frame elements, for example in accordance with FIGS. 4 and 5;

FIG. 7 a schematic perspective representation of an exemplary embodiment of a grid-like spacer intended for e.g. a cooling gas frame; and FIG. 8 a schematic representation of an exemplary embodiment of a membrane distillation plant comprising a multistage membrane distillation apparatus and a cooling apparatus.

FIG. 1 shows in a schematic representation an exemplary embodiment of a cooling apparatus 10 for cooling a liquid 12, for example water, having a vertical cooling tower 14 to which the liquid 12' to be cooled is supplied in an upper region 16 and from which the cooled liquid 12" is led off in a lower region 18.

The liquid 12 is cooled in the cooling tower 14 by a cooling gas 20, for example air, flowing from bottom to top. In this respect, inflow air and/or environmental air can, for example, be supplied to the cooling tower 14 in the lower region. Outflow air or moisturized air then correspondingly exits the upper region of the cooling tower 14. To increase the cooling power in the lower region of the cooling tower 14, one or more fans 90 can be provided, which brings about an induced ventilation.

At least one installation 24 in which the liquid 12 is conducted is provided in the gas space 22 of the cooling tower 14 flowed through by the cooling gas 20. In this respect, a respective installation 24 comprises at least one liquid passage 26 which is separated from the gas space 22 of the cooling tower 14 at least partly by a vapor-permeable, liquid-tight membrane wall 28 at both sides.

As can be recognized with reference to FIG. 1, a plurality of installations 24 can be provided in the gas space 22 of the cooling tower 14 flowed through by the cooling gas 20 which follow one another vertically and are connected in series.

FIG. 2 shows in a schematic representation an exemplary embodiment of an installation 24 of the cooling tower 14. Accordingly, a respective installation 24 can comprise a plurality of liquid passages 26 which are connected in parallel and preferably each extend generally vertically. In this respect, the liquid passages 26 can, as shown, in particular be arranged horizontally next to one another.

As shown in FIG. 2, a corresponding installation 24 can in particular comprise a plurality of liquid passages 26 which are connected in parallel, which are arranged horizontally next to one another and which are each separated from the gas space 22 of the cooling tower 14 on at least two mutually oppositely disposed sides by a membrane wall 28, in particular a flat membrane (cf. also FIG. 1 again). In this respect, a respective pair of horizontally adjacent liquid passages 26 has mutually facing membrane walls 28, in particular flat membranes, which laterally, i.e. between the two respective liquid passages 26, bound a gas passage 30 through which cooling gas 20 of the cooling gas flow acting on the gas space 22 flows (cf. also FIG. 1 again).

The hot liquid 12' to be cooled can therefore be supplied from above to the cooling tower 14 and to the first liquid passage 26 or to the membrane element. Cooling gas, in particular air, flows from below upwardly through the membrane elements forming the liquid passages 26 against the direction of flow of the liquid 12. The cooling gas is heated on flowing upward and is charged with water, with the density reducing and a rising cooling gas flow or air flow being adopted.

The liquid 12 flowing from top to bottom is preferably conducted such that it has a constant temperature development from hot in the upper region to cold in the lower region in the installations 24 of the cooling tower 14.

The liquid is advantageously supplied from top to bottom such that not the whole head of liquid of the liquid to be cooled loads the membrane walls 28, in particular the lower membrane walls in the direction of flow, which will be explained in more detail further below with reference to FIG. 3.

The installations 24 can be made up of individual elements. In this respect, these individual elements can, for example, be rectangular or square frame elements. Such frame elements can be spanned at at least one side by a vapor permeable, liquid tight membrane wall 28. These frame elements can be installed in a respective vertical orientation, for example, following one another horizontally in a respect installation 24. The frame elements are flowed through from bottom to top by the liquid 12. The liquid passages 26 and the gas passages 30 result from the frame elements after the combining together.

The vapor permeable, liquid tight membrane walls 28 can, for example, be microporous hydrophobic membranes, for example composed of PTFE.

A respective installation 24 can therefore comprise a plurality of mutually connected frame elements 32, with the functional units of liquid passage 26 and gas passage 30 each being provided in the form of such a frame element 32.

The frame elements 32 can be provided with web structures 34 and can be connected to one another via these web structures 34 (cf. also FIGS. 4 to 6).

In addition, the frame elements 32 can each be provided with a spacer 36, in particular a grid-like spacer, in particular for supporting the membrane walls 28 (cf. in particular FIGS. 4 to 7).

The membrane wall 28 provided between a respective liquid passage 26 and a respective gas passage 30 adjacent thereto can be associated with one of the two respective mutually adjacent frame elements 32.

As can be recognized with reference to FIG. 2, the liquid to be cooled is supplied via an inflow 38 to the first frame element 32 of a respective installation 24, whereas the cooled liquid is removed via an outflow 40 from the last frame element 32 of the structure 24.

The installations 24 which follow one another vertically and which are connected in series can in particular be connected to one another such that their liquid passages 26 are each completely filled with liquid 12.

As can be recognized, for example, with reference to FIG. 3, for this purpose vertically adjacent installations 24 can each be connected to one another via a return passage 42 which is arranged between a liquid outlet 44 provided in a lower region of a liquid passage 26 of the preceding installation viewed in the direction of flow of the liquid 12 (see also FIG. 2) and a liquid inlet or inflow 38 provided in an upper region of a liquid passage 26 of the following installation 24 and is first conducted upwardly, starting from the liquid outlet 44 of the preceding installation 24, at least up to the uppermost possible liquid level in this installation 24.

The upper region of the outflow part 48 of the return passage 42 configured in the manner of a U pipe can comprise a passage section 50 which is at least partly bounded by a further membrane wall 52, again preferably vapor permeable and liquid tight at both sides, which comes into contact with the liquid 12, on the one hand, and with the gas space 22 of the cooling tower 14, on the other hand.

The cooling tower liquid can therefore be conducted after the flowing through of the liquid passages, for example in a U-pipe apparatus which can comprise an upwardly leading pipe, a 180° deflection, a down pipe and an in particular hydrophobic, microporous membrane. The liquid exiting the cooling tower installation is in this respect conducted upwardly so far that the liquid passages of the cooling tower installation are always completely filled with liquid. The down pipes or outflow parts can be dimensioned such that they are never completely filled with liquid and there is thus no addition of the hydrostatic pressure of the cooling tower installations from top to bottom. So that the down pipe can run empty in downtime, the U pipe apparatus is fitted in its upper region with a piece of in particular microporous, hydrophobic membrane which is vapor permeable and air tight at both sides, for example. It is thus ensured that the down pipes can empty on a switching off of the liquid to be cooled and, conversely, on a putting into operation, no gas cushion or air cushion can build up since the gas or the air can both flow out and flow in via the membrane.

As can, for example, be seen from FIGS. 4 to 6, a respective installation 24 of the cooling tower 14 can in particular be configured as a modular flow system having a plurality of frame elements 32. In this respect, for example, the different functional units of liquid passage 26 and gas passage 30 can each be provided in the form of such a frame element 32.

The frame elements are preferably provided with web structures 34 via which they can in particular be connected to one another for forming the liquid passages 26 and the gas passages 30 of a respective installation 24. In this respect, the different frame elements can, for example, be welded or bonded to one another via the web structures 34. If, for example, welding web structures are used, a friction welding process, a laser welding process and/or a heating element welding process can be used for connecting the frame elements, for example.

The frame elements 32 each comprise an inner region 56 which is surrounded by an outer frame 54 and which is preferably provided with an in particular grid-like spacer 36.

FIG. 4 shows in a schematic front view an exemplary embodiment of a frame element 32 which can be used as a liquid frame. The frame element 32 can be respectively spanned with a membrane wall on both sides of the spacer 36 and conducts the liquid 12 from top to bottom in the cooling tower 14. Inlet openings 58 as well as outlet openings 60 for the liquid 12 are provided in the frame element 32. As can be recognized with respect to FIG. 4, a respective inlet opening 58 can, for example, be provided in the two upper corner regions of the frame element 32 and a respective outlet opening 60 can be provided in the two lower corner regions of the frame element 32. The membrane walls do not necessarily have to be provided at this liquid frame. They can alternatively also be provided at the cooling gas frame shown, for example, in FIG. 5. It is also conceivable that the frames are each only spanned at a side having a membrane wall. What is decisive is that a respective liquid passage and a respective cooling gas passage adjacent thereto are separated from one another by such a membrane wall.

FIG. 5 shows in a schematic front view an exemplary embodiment of a frame element 32 which can be used as a cooling gas frame. In the present case, the frame element 32 is open both at the bottom and at the top to form an inlet opening 62 in the lower region and an outlet opening 64 for the cooling gas or for the air in the upper region.

For example, in the two upper corner regions of the frame element 32, passage openings 66 are provided for the liquid 12' to be cooled. For example, in the two lower corner regions, passage openings 68 for the cooled liquid 12" are provided.

Such a cooling gas frame conducts the gas flow from bottom to top in the cooling tower 14. Inserts such as the spacer 36 support the adjacent membrane walls which can be associated with the adjacent frame elements or with this cooling gas frame element. The in particular grid-like spacer 36 provides an induced swirling of the cooling gas and a better water vapor transition from the membrane into the air. As already mentioned, passage openings 66 and 68 for the liquid to be cooled or for the cooled liquid are provided at the top and bottom.

FIG. 6 shows in a schematic, perspective expanded view an exemplary embodiment of an installation 24 of the cooling tower 14 comprising a plurality of frame elements 32. In this respect, for example, liquid frames 32' and cooling gas frames 32" of the kind shown in FIGS. 4 and 5 can be alternately installed following one another. In this respect, the cooling gas 20 and the liquid 12 flow in counterflow.

FIG. 7 shows in a schematic perspective representation an exemplary embodiment of a grid-like spacer 36 intended e.g. for a cooling gas frame.

Such a grid-like spacer 36 can therefore be arranged in a gas passage 30, for example. In this respect, the cooling gas can e.g. flow in the direction of the webs extending horizontally in FIG. 7. The webs 72 which are perpendicular thereto and are vertical in FIG. 7 have two functions. They thus support the membrane toward the gas passage in the stack structure and continuously destroy the border layer of the cooling gas to the membrane in the gas flow, whereby the forming temperature and concentration polarization of the air at the membrane is overcome as a rule.

FIG. 8 shows in a schematic representation an exemplary embodiment of a membrane distillation plant 76 comprising a multistage membrane distillation apparatus 74 as well as a cooling apparatus 14. In this respect, the cooling apparatus 14 can, for example, be configured such as has been previously described, inter alia with reference to FIGS. 1 to 7.

The multistage membrane distillation apparatus 74 serving for the concentration of the liquid 12 comprises an evaporator or vapor generator 78, a plurality of condensation and evaporation stages 80 as well as a condenser 82.

The liquid 12' to be concentrated is supplied to the system comprising the condenser 82 of the membrane distillation apparatus 74 and the cooling apparatus 14. The cooling apparatus 10 is connected upstream of the membrane distillation apparatus 74 for preconcentrating the liquid 12. Cooled liquid 12" from the cooling apparatus 10 is supplied to the condenser 82 as cooling fluid during the preconcentration.

The condenser 82 of the membrane distillation apparatus 74 can comprise a vapor space 84 as well as a cooling fluid passage 88 which is separated therefrom by a condensation wall 86 and which is a part of a coolant circuit comprising the installation or installations 24 of the cooling apparatus 10 during the preconcentration, in which coolant circuit the liquid to be concentrated circulates as a coolant.

A multistage concentration process can therefore be configured with such a membrane distillation plant 76 having a cooling tower with installations in accordance with the invention for preconcentration and having a concentration process connected downstream. The liquid coming, for example, from a bore hole for the conveying of unconventional gas in place can be supplied to the system of cooling tower and condenser for preconcentration. If the liquid or solution 12' comes into this system at a temperature lower than the condensation outlet temperature, the solution can be supplied, as shown at the bottom right in FIG. 8 in accordance with variant 1, that is after the outlet of the cooling tower 14. If the temperature of the liquid or solution 12' to be concentrated is the same as or higher than the condensation outlet temperature, the liquid 12' to be concentrated is supplied after the condenser 82 and before the cooling tower 14 in accordance with variant 2 (see top right of FIG. 8).

The concentration of the solution increases by evaporation of water from the solution to be concentrated. So-called blowdown water can be taken from the solution circuit of the cooling tower from a specific predefined concentration onward.

The blowdown water is supplied to a further concentration. This further concentration can take place using evaporators. These evaporators can in particular be multistage flash evaporators. As initially described, the membrane distillation apparatus can in particular be a vacuum multi-effect membrane distillation apparatus.

The solution preconcentrated in the cooling tower is concentrated, as much as possible, up to saturation in the evaporators. In the normal operating state, the concentrated solution is hotter than the environment of the plant after the concentration so that a portion of the contained salts already crystallizes on the cooling to e.g. environmental temperature after the pumping out of the concentrated solution. These salt crystals can be separated and the remaining solution can again be supplied fully or partly to the concentration. The remaining portion of the concentrated solution can also be supplied fully or partly to a further concentration in a crystallizer, for example, after the salt crystal separation.

REFERENCE NUMERAL LIST

10 cooling apparatus
12 liquid
12' liquid to be cooled
12" cooled liquid
14 cooling tower
16 upper region of the cooling tower
18 lower region of the cooling tower
20 cooling gas
22 gas space
24 installation
26 liquid passage
28 membrane wall
30 gas passage
32 frame element
32' liquid frame
32" cooling gas frame
34 web structure
36 spacer
38 inflow, inlet
40 outflow
42 return passage
44 liquid outlet
46 liquid inlet
48 outflow part
50 passage section
52 membrane wall
54 outer frame
56 inner region
58 inlet opening
60 outlet opening
62 inlet opening
64 outlet opening
66 passage opening
668 passage opening
70 web 72 web
74 multistage membrane distillation device
76 membrane distillation plant
78 evaporator
80 condensation and evaporation stage
82 condenser
84 vapor space
86 condensation wall
88 cooling fluid passage
90 fan

The invention claimed is:

1. A cooling apparatus for cooling a liquid, comprising:
a vertical cooling tower to which the liquid to be cooled is supplied in an upper region and from which the cooled liquid is led off in a lower region, wherein:
the liquid is cooled in the cooling tower by a cooling gas flowing from bottom to top in a gas space of the cooling tower;
the gas space of the cooling tower includes a plurality of installations, the liquid being conducted in each of the plurality of installations;
each of the plurality of installations includes at least one liquid passage;
the cooling tower includes one or more fans;
the at least one liquid passage of each of the plurality of installations is separated at least partly from the gas space of the cooling tower by a vapor permeable, liquid tight membrane wall;
the installations are disposed vertically and connected to each other in series;
the installations are connected to each other such that the liquid passages are each completely filled with liquid;
the installations disposed vertically adjacent to each other are connected to each other via a return passage which is arranged between a liquid outlet provided in a lower region of the liquid passage of the installation disposed upstream if viewed in the direction of flow of the liquid, and a liquid inlet provided in an upper region of the liquid passage of the installation disposed downstream if viewed in the direction of flow of the liquid;
the return passage is conducted upwardly starting from the liquid outlet of the upstream installation initially at least up to an uppermost liquid level in the installation;
the return passage is configured as a U pipe; and
an upper region of an outflow part of the return passage comprises a passage section which is at least partly bounded by a further membrane wall which comes into contact with the liquid and with the gas space of the cooling tower.

2. The cooling apparatus of claim 1, wherein the further membrane wall is vapor permeable and liquid tight at both sides.

3. The cooling apparatus of claim 1, wherein at least one installation of the plurality of installations comprises a plurality of liquid passages connected in parallel and each extending generally vertically.

4. The cooling apparatus of claim 3, wherein the liquid passages connected in parallel are arranged horizontally next to one another.

5. The cooling apparatus of claim 1, wherein at least one installation of the plurality of installations comprises a plurality of liquid passages which are connected in parallel and arranged horizontally next to one another, and wherein the liquid passages are each separated from the gas space of the cooling tower at least at two mutually oppositely disposed sides by the membrane wall, wherein the membrane wall laterally bounds the gas passage through which the cooling gas flows.

6. The cooling apparatus of claim 5, wherein the membrane wall separating the liquid passages from the gas space of the cooling tower is a flat membrane.

7. The cooling apparatus of claim 5, wherein each of the plurality of installations comprises a plurality of frame elements that are connected with each other, each of the frame elements forming the liquid passage and the gas passage.

8. The cooling apparatus of claim 7, wherein the frame elements are provided with web structures so as to connect the frame elements with each other.

9. The cooling apparatus of claim 7, wherein the frame elements are each provided with a spacer.

10. The cooling apparatus of claim 9, wherein the spacer is a grid-like spacer.

11. The cooling apparatus of claim 7, wherein the membrane wall provided between the liquid passage and the gas passage adjacent thereto is associated with one of the frame elements.

12. A membrane distillation plant comprising:
a multistage membrane distillation apparatus comprising an evaporator, a plurality of condensation and evaporation stages, and a condenser for concentrating a liquid and having a cooling apparatus; and
the cooling apparatus comprising a vertical cooling tower to which the liquid to be cooled is supplied in an upper region and from which the cooled liquid is led off in a lower region, wherein:
the liquid is cooled in the cooling tower by a cooling gas flowing from bottom to top in a gas space of the cooling tower;
the gas space of the cooling tower includes a plurality of installations, the liquid being conducted in each of the plurality of installations;
each of the plurality of installations includes at least one liquid passage;
the cooling tower includes one or more fans;
the at least one liquid passage of each of the plurality of installations is separated at least partly from the gas space of the cooling tower by a vapor permeable, liquid tight membrane wall;
the installations are disposed vertically and connected to each other in series;
the installations are connected to each other such that the liquid passages are each completely filled with liquid;
the installations disposed vertically adjacent to each other are connected to each other via a return passage which is arranged between a liquid outlet provided in a lower region of the liquid passage of the installation disposed upstream if viewed in the direction of flow of the liquid, and a liquid inlet provided in an upper region of the liquid passage of the installation disposed downstream if viewed in the direction of flow of the liquid;
the return passage is conducted upwardly starting from the liquid outlet of the upstream installation initially at least up to an uppermost liquid level in the installation;
the return passage is configured as a U pipe;
an upper region of an outflow part of the return passage comprises a passage section which is at least partly bounded by a further membrane wall which comes into contact with the liquid and with the gas space of the cooling tower, the liquid to be concentrated is supplied to the condenser of the membrane distillation apparatus and the cooling apparatus;

the cooling apparatus is disposed upstream of the membrane distillation apparatus for preconcentrating the liquid; and liquid cooled during the preconcentration is supplied as cooling fluid to the condenser from the cooling apparatus.

13. The membrane distillation plant of claim 12, wherein the further membrane wall is vapor permeable and liquid tight at both sides.

14. The membrane distillation plant of claim 12, wherein the condenser of the membrane distillation apparatus comprises a vapor space and a cooling fluid passage which is separated from the vapor space by a condensation wall and which is part of a coolant circuit comprising at least one installation of the plurality of installations during the preconcentration, wherein the liquid to be concentrated circulates as a coolant in the coolant circuit.

* * * * *